United States Patent
Jerby et al.

(10) Patent No.: US 9,578,695 B2
(45) Date of Patent: Feb. 21, 2017

(54) METHOD AND DEVICES FOR SOLID STRUCTURE FORMATION BY LOCALIZED MICROWAVES

(71) Applicants: FUNDACIO PRIVADA ASCAMM, Cerdanyola del Valles (ES); Eli Jerby, Rishon Letzion (IL); Alon Salzberg, Holon (IL); Yehuda Meir, Bat Yam (IL)

(72) Inventors: Eli Jerby, Rishon Letzion (IL); Alon Salzberg, Holon (IL); Yehuda Meir, Bat Yam (IL); Francisco Javier Planta Torralba, Barcelona (ES); Rafael Rubio Bonilla, Cerdanyola del Valles (ES); Benjamin Cavallini, Barcelona (ES)

(73) Assignees: Fundacio Privada ASCAMM, Cerdanyola del Valles (ES); Eli Jerby, Rishon Letzion (IL); Alon Salzberg, Holon (IL); Yehuda Meir, Bat Yam (IL)

( * ) Notice: Subject to any disclaimer, the term of this patent is extended or adjusted under 35 U.S.C. 154(b) by 706 days.

(21) Appl. No.: 14/035,300

(22) Filed: Sep. 24, 2013

(65) Prior Publication Data

US 2014/0021171 A1    Jan. 23, 2014

Related U.S. Application Data

(63) Continuation-in-part of application No. PCT/IB2012/051425, filed on Mar. 26, 2012.
(Continued)

(51) Int. Cl.
*B22F 3/105* (2006.01)
*H05B 6/80* (2006.01)
(Continued)

(52) U.S. Cl.
CPC .............. *H05B 6/80* (2013.01); *B22F 3/105* (2013.01); *B23K 37/00* (2013.01); *B28B 1/001* (2013.01);
(Continued)

(58) Field of Classification Search
CPC ................................. B22F 2003/1054
See application file for complete search history.

(56) References Cited

U.S. PATENT DOCUMENTS 5,204,055 A * 4/1993 Sachs ...................... B05C 19/04
                                                          264/113
5,789,064 A * 8/1998 Valente .................... B05D 3/08
                                                          174/388
(Continued)

FOREIGN PATENT DOCUMENTS

GB      2 422 344 A    7/2006
WO   WO 2010/125371 A1   11/2010

OTHER PUBLICATIONS

International Search Report for PCT/IB2012/051425 mailed Jun. 25, 2012.

*Primary Examiner* — Jessee Roe
*Assistant Examiner* — Ngoclan T Mai
(74) *Attorney, Agent, or Firm* — RatnerPrestia

(57) ABSTRACT

Method and device for solid structure formation by localized microwaves for additive fabrication of solid bodies by use of localized microwave radiation applied to a source material, in the form of a powder, wire or other solid form, so as to generate a hotspot in a thermal-runaway process or through plasma breakdown, and melt a small portion of it (with at least one dimension smaller than the microwave wavelength) thereby consolidating small pieces of the molten source material in a stepwise manner to construct the entire body.

14 Claims, 3 Drawing Sheets

Related U.S. Application Data

(60) Provisional application No. 61/467,019, filed on Mar. 24, 2011.

(51) Int. Cl.
  *B28B 1/00* (2006.01)
  *B29C 67/00* (2006.01)
  *B23K 37/00* (2006.01)
  *B29C 35/08* (2006.01)

(52) U.S. Cl.
  CPC .. *B29C 67/0077* (2013.01); *B22F 2003/1054* (2013.01); *B22F 2003/1056* (2013.01); *B29C 2035/0855* (2013.01); *Y02P 10/295* (2015.11)

(56) References Cited

U.S. PATENT DOCUMENTS

| | | |
|---|---|---|
| 6,114,676 A | 9/2000 | Jerby et al. |
| 6,214,279 B1 | 4/2001 | Yang et al. |
| 6,243,616 B1 | 6/2001 | Droscher et al. |
| 2004/0232583 A1 | 11/2004 | Monsheimer et al. |

* cited by examiner

METHOD AND DEVICES FOR SOLID STRUCTURE FORMATION BY LOCALIZED MICROWAVES

CROSS REFERENCE TO RELATED APPLICATIONS

This is a Continuation-in-Part (CIP) application of PCT/IB2012/051425, filed Mar. 26, 2012, which claims priority to U.S. Provisional Application No. 61/467,019, filed Mar. 24, 2011, the contents of such applications being incorporated by reference herein.

FIELD OF THE INVENTION

The present invention relates to additive fabrication techniques and, in particular, it concerns methods and corresponding devices for additive fabrication of objects by localized application of microwave radiation.

Beside the major mass production trend in the manufacturing industry, there is also a growing need for more custom made products. Such items are tailored for specific needs and are produced therefore in small quantities or even in single units, as for instance personally adapted prostheses and implants in the medical sector. Similarly, other industries, as in the aerospace, automotive, and military sectors, are interested as well in such custom capable technologies to manufacture unique products with complex geometries.

BACKGROUND OF THE INVENTION

The concept of additive manufacturing has been developed in various directions, namely 3D-printing, 3D-prototyping, and rapid manufacturing. These technologies are widely used to produce a broad range of parts in various industries. Unlike conventional machining technologies, where material is removed from plain solid blocks to obtain the desired part, additive manufacturing technologies produce the solid body layer by layer by super-positioning cross sections of the raw material. Typically, custom-made products are manufactured directly from its 3D computer aided design (CAD) model, which is pre-processed —for part orientation, creation of horizontal cross sections, and definition of other relevant process parameters—and fed as an input file to the manufacturing machine control. Additive manufacturing is capable also of making parts that otherwise would be impossible to produce with conventional machining methods, or require expensive molds or dies. Currently, the technologies used for direct manufacturing of metallic parts from powders are selective laser sintering (or melting), stereo-lithography, direct-metal laser sintering and spark-plasma sintering. Such devices are generally too large and costly to be widely used.

US2004232583 describes an additive fabrication process for sequentially incrementing a workpiece to form a desired object, the process comprising:
 a. providing a layer of pulverulent substrate;
 b. selectively applying at least one microwave-absorbing susceptor to one or more regions of the substrate;
 c. treating the layer at least once with microwave radiation, to melt the regions containing the susceptor.
 d. cooling the layer.

GB2422344 describes an additive fabrication process for sequentially incrementing a workpiece to form a desired object, the process comprising the same steps a, b and c described in US2004232583, but using infrared radiation to meld the powder.

The cited prior art patents requires extending a layer of source material, and adding a susceptor to some regions of said source material layer. It has to be noted though that US2004232583 does not employ a localized microwave applicator, and that it requires adding susceptors (microwave absorbing additives) to the raw material, hence this method is not applicable for instance to pure metal powders. Regarding GB2422344, infrared is a different type of radiation than microwaves. It is generated and guided by completely different devices, and has different physical properties.

U.S. Pat. No. 6,243,616 B1 describes an additive fabrication device for sequentially incrementing a workpiece to form a desired object, the device comprising:
 a feeder for providing source material onto a surface in a desired uniform thickness;
 a microwave apparatus including a microwave generator able to create a microwave radiation in the frequency range of 430 to 6800 MHZ, and a microwave applicator able to provide said microwave, preferably focused onto a beam width of 0.1 to 3 mm, particularly preferably 0.3 to 1 mm;
 a controlled displacement mechanism for generate relative displacement between said support structure and said microwave applicator so that a layer by layer structure is performed.

The referenced patent describes a microwave frequency range focused in a beam with a size which is essentially larger than the wavelength, so it can't induce a thermal-runaway process (note that U.S. Pat. No. 6,243,616 B1 does not present any implementation of the microwave applicator that can focus the microwave energy to a spot smaller than a wavelength, and it does not present any physical mechanism that may compensate for the natural diffraction of the microwave energy expected in the schemes presented there). Further this document deals also with a layer-by-layer deposition, whereas we propose, as discussed below, also localized feeding of the raw material either in a powder or a wire form, directly by and/or in combination with a microwave applicator. U.S. Pat. No. 6,243,616 B1 is relevant mainly for polymer materials, and to microwave absorbing materials (see column 4, lines 46-47, ". . . (materials) have a dipolar basic structure", hence it is not applicable for pure metal powders (which obviously have no dipolar structure). The irrelevance to pure metals is also indicated clearly in the description of the invention there (see column 4, Line 49, where the applicability is limited to "metal powders coated with these polymers", whereas the latter are needed as microwave absorbers. In the present invention, other mechanisms are employed, such as localized microwave inner plasma breakdown; hence the present invention is applicable also for metal powders, with no coatings or additives as the previous cited prior arts.

U.S. Pat. No. 6,214,279 describes an additive fabrication process, which deals with composite materials and multi-component fabrication, using an adhesive product to solidify the source material.

With regard to the previous art the proposed invention provide an additive fabrication method and corresponding device in which localized microwaves are employed to melt or sinter the source material to increment the object being fabricated wherein localized microwave radiation is applied through a near-field microwave applicator configured to apply the microwave radiation to transform the source material within an included volume receiving the localized microwave radiation, said included volume having at least one dimension smaller than a wavelength of the microwave radiation induces intentionally either a thermal-runaway instability and/or inner plasma breakdown in between the source material particles.

U.S. Pat. No. 6,114,676 discloses, but in the context of a microwave drill technology, localized application of microwaves" preferably achieved by use of a near-field applicator, to eliminate material from a solid concentrating the microwave radiation into a volume having at least one dimension smaller than the microwave wavelength, and most preferably smaller than half the microwave wavelength, thereby inducing a thermal-runaway process in which the local temperature increase is accelerated by the temperature-dependent parameters of the raw material, and a confined hotspot is formed rapidly. According to this method, small amounts of source material in front of the applicator are melted and removed. Therefore, it has to be noted that while the present invention employs a similar applicator to U.S. Pat. No. 6,114,676, the purpose is totally different, as the present invention deals with additive construction, mainly of powders, whereas U.S. Pat. No. 6,114,676 deals mostly with removing (e.g. drilling) of solid materials. The joining application in U.S. Pat. No. 6,114,676 refers to metal parts rather than powders.

SUMMARY OF THE INVENTION

The present invention is a method and corresponding device for additive fabrication of objects by localized application of microwave radiation to achieve localized transformation of source material to increment a workpiece, thereby successively adding to the workpiece to form the final desired solid object.

This localized application of microwaves to construct 3D structures concentrates the microwave radiation into a volume having at least one dimension smaller than the microwave wavelength, and most preferably smaller than half the microwave wavelength, thereby typically inducing a thermal-runaway process, and/or inner plasma breakdown or micro-plasma excitation between the powder's particles, in a small spot in which the local temperature increase is accelerated by the temperature-dependent parameters of the raw material, and a confined hotspot is formed rapidly. In the case of a powder source material, this mechanism can be accompanied by plasma breakdown between the powder particles, which expedite the melting process. Microwave-based additive fabrication devices are potentially lower in cost and more compact than laser-based manufacturing systems. The more volumetric effect of microwaves may also generate more uniform volumetric properties and better internal bonding in the final object than typically achieved by use of laser sintering.

Thus, certain preferred implementations of the invention provide a method and devices for stepwise construction of 3D structures by using a microwave concentrator. According to this method, small amounts of source material in front of the applicator are melted or sintered by the localized microwaves, and attached as building blocks to the underlying structure.

The practical devices derived from this invention are various applicators for localized microwave energy with the capability to construct 3D structures stepwise according to a design programmed by a user.

Thus, according to the teachings of an embodiment of the present invention there is provided, an additive fabrication method for sequentially incrementing a workpiece to form a desired object, the method comprising the steps of: (a) providing a quantity of source material at a location where a structural element is to be added to the workpiece; (b) processing the quantity of source material by application of localized microwave radiation so as to transform the source material into an integrated portion of the workpiece, thereby generating an incremented workpiece; and (c) repeating steps (a) and (b) to sequentially increment the workpiece to form the desired object.

According to a further feature of an embodiment of the present invention, the source material is provided as a powder that is selectively integrated with the workpiece by application of the localized microwave radiation.

According to a further feature of an embodiment of the present invention, the powder is provided as a layer overlying the workpiece, and wherein the localized microwave radiation is applied selectively at locations where a structural element is to be added to the workpiece.

According to a further feature of an embodiment of the present invention, the powder is provided via a powder feeder selectively to the location where a structural element is to be added to the workpiece.

According to a further feature of an embodiment of the present invention, the localized microwave radiation is applied through a near-field microwave applicator, and wherein at least part of the powder feeder passes through the near-field microwave applicator.

According to a further feature of an embodiment of the present invention, the localized microwave radiation is applied through a coaxial waveguide applicator, and wherein the powder feeder passes the powder along a channel formed within an inner conductor of the coaxial waveguide applicator.

According to a further feature of an embodiment of the present invention, the source material is provided as a continuous solid material that is fed to the location where a structural element is to be added to the workpiece.

According to a further feature of an embodiment of the present invention, the continuous solid material is formed as a wire.

According to a further feature of an embodiment of the present invention, the localized microwave radiation is applied through a near-field microwave applicator, and wherein the wire is fed through the near-field microwave applicator.

According to a further feature of an embodiment of the present invention, the localized microwave radiation is applied through an open-ended coaxial waveguide applicator, and wherein the wire is fed along a channel formed within an inner conductor of the coaxial waveguide applicator, or serving as the inner conductor of the coaxial waveguide applicator.

According to a further feature of an embodiment of the present invention, the continuous solid material is formed as a sheet.

According to a further feature of an embodiment of the present invention, the source material is a metallic material, even pure metal.

According to a further feature of an embodiment of the present invention, the source material is a ceramic material.

According to a further feature of an embodiment of the present invention, the localized microwave radiation is applied through a near-field microwave applicator configured to apply the microwave radiation to a transform the source material within a volume having at least one dimension smaller than a wavelength of the microwave radiation.

According to a further feature of an embodiment of the present invention, the workpiece is supported on a support structure, the method further comprising generating relative motion between the near-field microwave applicator and the support structure so as to successively increment the workpiece at different locations.

According to a further feature of an embodiment of the present invention, an entirety of the workpiece is formed from the source material.

There is also provided according to an embodiment of the present invention, an additive fabrication device for sequentially incrementing a workpiece to form a desired object, the device comprising: (a) a support structure for supporting a workpiece during fabrication of the desired object; (b) a feeder for providing source material to at least a location where a structural element is to be added to the workpiece; (c) a microwave apparatus including a microwave generator and a near-field microwave applicator, the near-field microwave applicator being configured to apply localized microwave radiation to a quantity of the source material so as to transform the quantity of source material into an integrated portion of the workpiece, thereby incrementing the workpiece; (d) a displacement mechanism for generating relative displacement between the support structure and the near-field microwave applicator; and (e) a controller associated with the feeder, the microwave apparatus and the displacement mechanism, the controller being configured to successively generate displacements to position the near-field microwave applicator and actuate the microwave generator so as to successively transform quantities of the source material provided by the feeder into increments to the workpiece, thereby fabricating the desired object.

According to a further feature of an embodiment of the present invention, the feeder provides the source material as a powder that is selectively integrated with the workpiece by application of the localized microwave radiation.

According to a further feature of an embodiment of the present invention, the feeder is configured to apply the powder as a layer overlying the workpiece.

According to a further feature of an embodiment of the present invention, the feeder is configured to provide the powder selectively to locations where a structural element is to be added to the workpiece.

According to a further feature of an embodiment of the present invention, the feeder is configured to deliver the powder through the near-field microwave applicator.

According to a further feature of an embodiment of the present invention, the near-field microwave applicator is implemented as a coaxial waveguide applicator, and wherein the feeder is configured to deliver the powder along a channel formed within an inner conductor of the coaxial waveguide applicator.

According to a further feature of an embodiment of the present invention, the feeder provides the source material as a continuous solid material.

According to a further feature of an embodiment of the present invention, the continuous solid material is formed as a wire.

According to a further feature of an embodiment of the present invention, the feeder is configured to deliver the wire through the near-field microwave applicator.

According to a further feature of an embodiment of the present invention, the near-field microwave applicator is implemented as an open-ended coaxial waveguide applicator, and wherein the feeder is configured to deliver the wire along a channel formed within an inner conductor of the coaxial waveguide applicator, or serving as the inner conductor of the coaxial waveguide applicator.

According to a further feature of an embodiment of the present invention, the continuous solid material is formed as a sheet.

According to a further feature of an embodiment of the present invention, the raw material is provided in a form of gel or viscous liquid.

According to a further feature of an embodiment of the present invention, the near-field microwave applicator is configured to apply the microwave radiation to transform the source material within a volume having at least one dimension smaller than a wavelength of the microwave radiation.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
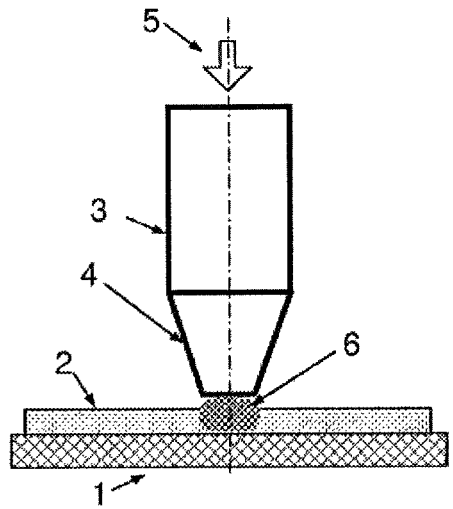
FIG. 1 is a schematic representation of a first embodiment of the present invention for additive fabrication by selective melting and consolidation of regions of a powder bed by direct application of localized microwave radiation, thereby incrementally forming a desired object according to a predefined construction plan.

The present invention is a method and corresponding device for additive fabrication of objects by localized application of microwave radiation.

The principles and operation of methods and devices according to the present invention may be better understood with reference to the drawings and the accompanying description.

In general terms, an additive fabrication method according to certain implementations of the present invention proceeds by providing a quantity of source material, typically unattached to a part of the object already formed (i.e., "partial object" or "workpiece"), at a location where a structural element is to be added to the workpiece. The source material at that location is then processed by application of localized microwave radiation so as to transform the source material into an integrated portion of the workpiece, thereby generating an incremented workpiece. This process is repeated, typically at multiple locations in each of multiple layers, until the full predefined object is formed.

Parenthetically, it should be noted that the "full predefined object" in this case is the predefined intended output of the additive fabrication process, but does not necessarily correspond to a final finished product. It is common for additive fabrication processes to include various post-processing steps, which may include surface smoothing and other finishing steps, as well as removal of any temporary bridging portions or support structures which may be formed for support or to retain relative positions of parts of the object during fabrication.

The entire workpiece, and hence the entire final object, may be formed from a single type of source material which is successively built up on a suitable support platform "table". Alternatively, in some cases, the device and method of the present invention may be used to increment an initial starting object or "blank", which may be made of the same material as the source material or any other material which bonds effectively with the source material. In some applications, various different source materials may be used for different parts of the object so as to provide, for example, specific desired mechanical, electrical or chemical properties to different regions of the final object.

In certain particularly preferred embodiments of the present invention, the source material is provided as a powder that is selectively consolidated by application of the localized microwave radiation. The powder may be applied as a layer overlying the workpiece, as will be described below with reference to FIGS. 1 and 2. In this case, the localized microwave radiation is applied selectively at locations where a structural element is to be added to the workpiece. The remainder of the layer remains as powder, which is subsequently removed, optionally with the aid of suction or other fluid-flushing techniques, and is preferably recovered for re-use.

In an alternative set of particularly preferred implementations (FIGS. 3 and 4), the source material, e.g. powder, is provided via a powder feeder which delivers the powder in the desired quantity selectively to the location where a structural element is to be added to the workpiece. In some cases, at least part of the powder passes through an included volume of a near-field microwave applicator used to deliver the localized microwave radiation. An example of this option, described below with reference to FIG. 4, employs a coaxial waveguide applicator with a hollow inner conductor which provides a channel along which the powder is introduced.

Other preferred embodiments of the present invention provide the source material as a continuous solid material that is fed to the location where a structural element is to be added to the workpiece. In certain cases, such as will be described below with reference to FIG. 5, the continuous solid material is formed as a wire, which here too may be fed through a channel in the near-field or in-contact microwave applicator. Other form-factors for supplying source material as a continuous solid are also possible such as, for example, a sheet of material.

For the purpose of this document, the term "microwave radiation" is used to refer generically to electromagnetic radiation in a range of frequencies from 1 MHz to 1 THz. For most preferred applications, the microwave radiation employed to implement the present invention is in the range from 300 MHz to 300 GHz, and for certain particularly preferred implementations, in the range from 1 GHz to 100 GHz. In certain cases, it may be preferably to operate at certain specific frequencies allocated for ISM (Industrial, Scientific and Medical) applications, such as 915 MHZ, 2.45 GHz and/or 5.8 GHz.

The source material may be any material in a form which can be melted or sintered by application of localized microwave radiation, including metallic materials (metals and metal alloys) and ceramic materials. Particularly preferred specific examples include, but are not limited to, alumina powder, zinc oxide powder, copper powder, bronze powder, tungsten powder, cobalt powder, and iron powder. Alternatively, in some cases, the source material may be a composition which undergoes a chemical change as a result of the localized application of microwave radiation. A non-limiting example of such an implementation would be curing of an epoxy. As mentioned above, the material may be provided either in the form of a powder (used generically to refer to any particulate form, including fine powder, granules, flakes or the like), or may be a continuous solid, such as a wire or a sheet of material. Operating parameters and applicator design are preferably chosen so as to melt the source material into a viscous liquid which adheres to the adjacent partial model without losing its shape or dripping to an unwanted location. Typical voxel sizes for the increment added to the object at each point are a spherical or flattened disk shape of diameter in the range from about 1 millimeter to about 10 millimeters.

Turning now to the drawings in more detail, FIG. 1 shows a schematic illustration of an embodiment in which a solid structure 1 is constructed in a stepwise manner by selective consolidation of successive layers of powder 2 into which the microwave waveguide 3, terminating in a microwave concentrator 4, radiates microwave energy provided to input port 5 in order to create a localized hotspot 6, by thermal-runaway instability and/or inner plasma breakdown or micro-plasma excitation, in which the powder becomes molten, and is consequently deposited on the underlying surface or consolidated with prior-formed parts of the object as a building block of the entire body under construction.

The structure of concentrator 4 is not illustrated here in detail, but may be any type of applicator or waveguide termination or antenna which is effective to generate near-field radiation within a small volume of an adjacent dielectric material with which it interacts. Various suitable arrangements are known in the art of microwave drill, including but not limited to, an open-ended coaxial waveguide, an open-ended strip-line waveguide, a short monopole antenna and a hollow waveguide.

Figure 2:
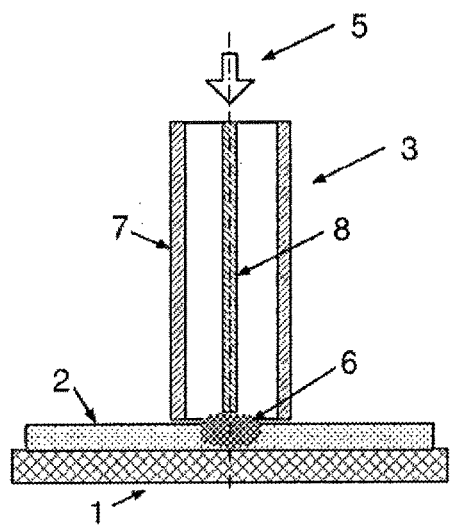
FIG. 2 is a schematic illustration of an implementation of the localized microwave applicator of FIG. 1 realized as a coaxial waveguide.

FIG. 2 illustrates an example of the embodiment in FIG. 1 in which the waveguide 3 is made of a coaxial structure with an outer conductor 7 and an inner conductor 8, which also directs the energy in a localized manner into the powder to create the hotspot 6 in the interaction region, typically just beyond the end of the inner electrode.

The approach of FIGS. 1 and 2 typically proceeds by spreading an even layer of the source material as a powder flattened out at a level higher by a given layer increment than a previous layer of the object that was previously formed. In some applications, layer thickness may be in the range of 1-10 millimeters. In other applications, smaller dimension increments may be preferred where high precision or particularly intricate structures are to be formed. The microwave applicator is then used to apply localized radiation into all regions of the layer that are meant to be consolidated with the workpiece to form part of the final object. The next layer of powder is then deposited and spread, and the process repeated. Typically, the incremental height to the object after treatment of each layer is less than the layer thickness of the source material, so the quantity of source material added to form the next layer is calculated accordingly. Some redistribution within the layer is preferably performed to ensure that all regions of the workpiece are covered by a uniform layer of the desired thickness. This can be achieved using a simple spreader mechanism.

The untransformed regions of powder are typically left as support for the subsequent layers during the production process, and are removed at the end by suitable techniques (e.g., gravity, vibration, suction and/or fluid flushing), with the unused powder preferably being reused in the next production process. Alternatively, the unused powder may be removed at the completion of each layer, or after a certain number of layers, and an inert filler material may be introduced to support the subsequent layers of powder. The inert filler is preferably chosen so as to be readily removable at the end of the fabrication process, such as by melting or combusting under conditions which do not damage the fabricated object. In some case, a wax filler may be suitable.

Figure 3:
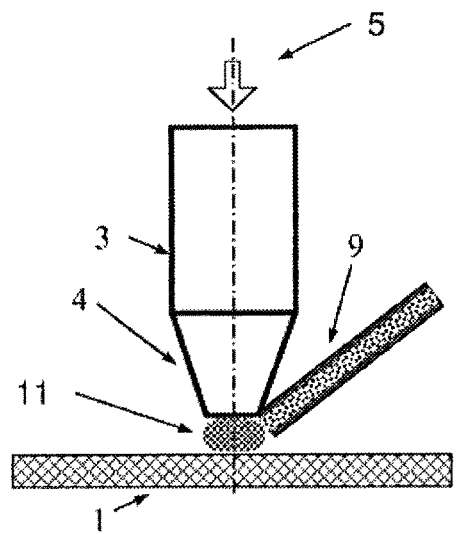
FIG. 3 is a further schematic illustration of an embodiment of the present invention in which the source material, e.g. powder to be consolidated, is supplied selectively and synchronously only to the radiated interaction region.
Figure 4:
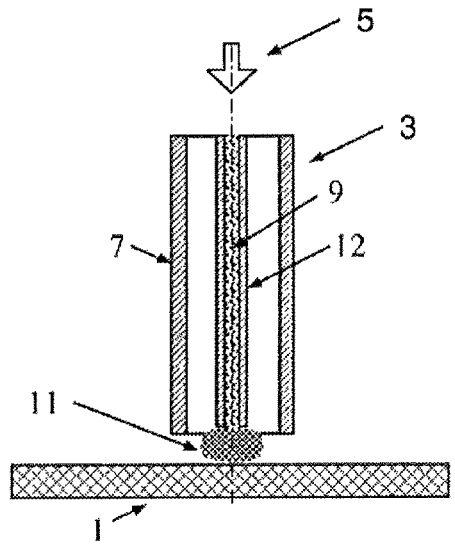
FIG. 4 is a schematic illustration of an implementation of the localized microwave applicator of FIG. 3 in which the powder is supplied through a bore along the center electrode of the coaxial waveguide.

An alternative approach to feeding the source material is illustrated in the embodiments of FIGS. 3 and 4, where the material is selectively fed to the locations in which it is needed to form an increment to the workpiece. In FIG. 3, a powder feeder 9 external to the microwave applicator delivers powder via a delivery conduit to a region in front of microwave concentrator 4, preferably synchronously feeding the exact amount of powder necessary for each building block 11 during, or immediately prior to, each activation of the microwave applicator. In some cases, a support structure or "partial mold" (not shown) with low microwave absorbance extends around at least part of the building block powder volume to support the powder while microwave radiation is being applied. Alternatively, the support can be provided by a force field applied externally. The support structure is preferably deployed on one or two sides of the applicator corresponding to the direction of scanning motion of the applicator relative to a table supporting the workpiece, such that the support structure does not obstruct bonding of the transformed source material to the previously formed parts of the workpiece.

FIG. 4 illustrates an implementation similar to that of FIG. 3 in which the powder feeder 9 is integrated with the microwave waveguide 3. In this example, the powder feeding tube is incorporated within the coaxial waveguide as a hollow inner electrode 12, in which the powder is delivered to the interaction region 11.

A range of different implementations of the feed mechanism may readily be implemented by a person having ordinary skill in the art. Non-limiting examples include a simple piston-based delivery system and an Archimedes screw conveyor mechanism.

Figure 5:
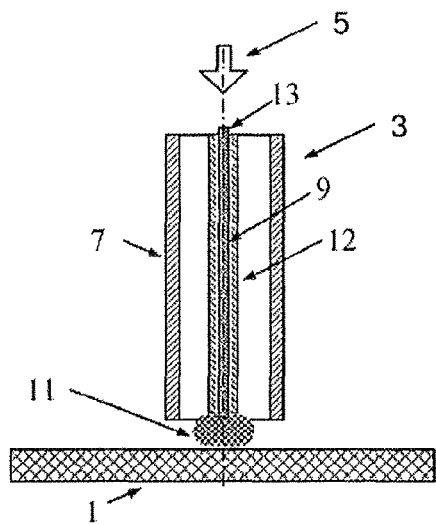
FIG. 5 is a schematic illustration of an implementation similar to FIG. 4 in which the source material is supplied as a continuous solid wire.

Alternative embodiments employ feeding of source material to the microwave interaction region in the form of a continuous solid material. In the case of source material provided in the form of a wire, the embodiments illustrated in FIGS. 3 and 4 can be modified for introduction of wire through the feeder 9. Such an implementation is illustrated in FIG. 5. The wire 13 is fed through the bore hole of feeder 9 in the inner electrode 12 towards the interaction region 11, in which it is melted and joined as a building block to the substrate 1. Alternatively, the source material can be provided in a form of gel or viscous liquid. Other form factors of source material may also be used. For example, in certain implementations, preformed cubes or other preformed unitary blocks of source material may be fed to the microwave interaction region one-by-one. Alternatively, a solid sheet may be fed to the interaction region in a raster pattern motion such that each actuation of the microwave device transforms a further "bite" out of the sheet into the next increment to the model.

Figure 6:
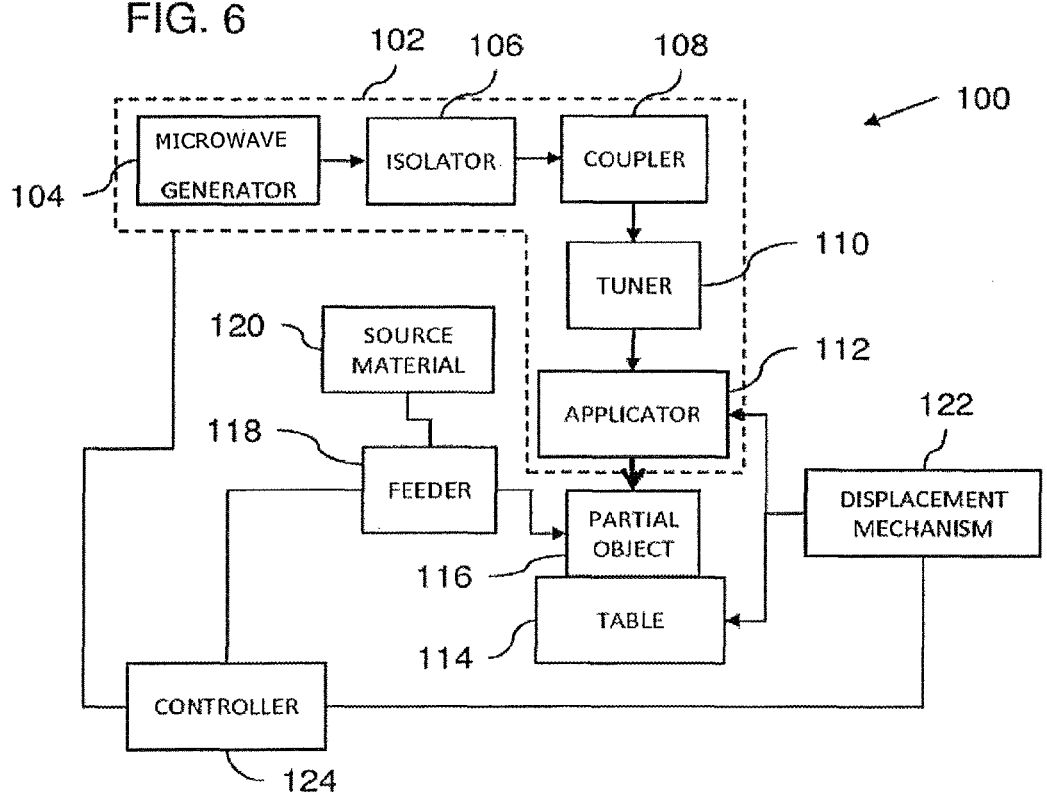
FIG. 6 is a block-diagram of an additive fabrication device according to an embodiment of the present invention, suitable for use with a localized microwave radiation applicator according to any of FIGS. 1-5.

Turning now to the remaining features of an additive fabrication device according to the present invention, all of the implementations of FIGS. 1-5 operate in the context of an overall system which is represented by way of a non-limiting example in FIG. 6. The illustrated device, generally designated 100, includes a microwave apparatus 102 which includes a microwave generator 104, and typically also an isolator 106 to protect the source, a coupler 108 to measure the incident and reflected waves, and a tuner 110 for adaptive impedance matching of a near-field microwave applicator 112 (such as any of the applicators illustrated above) under various operating conditions.

The microwave can be generated by a microwave tube, e.g. magnetron, or a solid state circuit.

A support structure, such as a table 114, is provided for supporting the workpiece 116 during fabrication of the desired object. A feeder 118 is deployed to feed source material from a source material repository 120 to at least a location where a structural element is to be added to workpiece 116. Details of feeder 118 and repository 120 (if needed) are implemented according to the type of source material used, for example, suited to spreading powder, or localized feeding of powder, or feeding of wire or some other solid form source material, all in accordance with the various examples discussed above, and as will be clear to a person ordinarily skilled in the art.

A displacement mechanism 122 is deployed to generate relative displacement between table 114 and near-field microwave applicator 112. The relative motion is three-dimensional motion, but can be implemented in many ways. In some cases, it is preferred to keep the microwave apparatus stationary and provide a table displacement mechanism which controls the position of the table in three-dimensions. In other implementations, the table may provide only up-down motion between layers, while the microwave applicator moves in a two-dimensional motion across the layer currently being formed. In some cases, the table may be fully static, and the microwave apparatus may perform all of the required motion. Where motion is to be performed by the microwave apparatus, it may be preferably to provide the microwave applicator at the end of a flexible waveguide such that the microwave generator can remain static as the applicator moves. Alternatively, the entire integrated microwave apparatus may be moved as a unit.

A controller 124 is associated with the microwave apparatus 102, feeder 118 and displacement mechanism 122 to coordinate the operation of all parts of the device. Controller 124 typically includes a data storage medium for storing data regarding the object to be produced, a user interface, various inputs and outputs, and at least one processor, all as will be clear to a person of ordinary skill in the art. For simplicity of presentation, the components of controller 124 are not detailed in the drawing. Controller 124 is configured to successively generate displacements to position the near-field microwave applicator and actuate the microwave generator so as to successively transform quantities of the source material provided by the feeder into increments to the workpiece, thereby fabricating the desired object.

It should be noted that the relative motion of the microwave applicator and the workpiece may in some cases be performed during delivery of microwave radiation, as a continuously advancing process. For example, where a relatively large area is to be added in a given layer, the microwave device may be actuated continuously, or in a sequence of pulses, to deliver the required energy density as it moves across a layer of a powder bed, or as source material is continuously fed to the moving interaction region, thereby forming an extended structural element addition to the workpiece.

The additive fabrication device described herein may be used as a free-standing device, or may be integrated as a replacement unit in an existing CNC machine. Furthermore, it can be integrated also with a laser-based additive manufacturing system, whereas the laser is employed for the fine details and the outer surface, and the microwaves are used for the rough structural construction underline.

The products/objects to be formed may have complex geometries and structures, including for example thin walls and hidden voids or channels. Fine detailed structures may be combined with more bulky parts, and solid and lattice geometries can be produced together to create a single object, such as a hip stem, teeth or orthopedic implants where oseointegration is enhanced by the surface geometry.

In some cases, the fabrication process may be optimized by dynamically varying the size of the added element or "voxel" used to construct the object, employing a smaller voxel in regions where intricate detail or high precision is required, and a larger voxel to reduce fabrication time for larger contiguous regions. In implementations with selective delivery of source material for each voxel, the voxel size is typically adjusted by varying the volume of powder delivered and making a corresponding change to the microwave pulse, power or duration or varying the frequency of the microwave radiation. Even in the case of a continuous layer of source material powder, some degree of variation in voxel size can be achieved by varying the power delivered. More extensive variation in voxel size can be achieved by employing switching between two different wavelengths of microwave radiation and/or switching between two different designs of applicator. These same parameters are used in design of a device, even without dynamic variation of voxel size, to ensure that the voxel size of a given device is appropriate to the level of intricacy and precision required of the given device according to its intended application. In all cases, the size of each voxel is preferably less than one percent of the total object volume, and typically very much less.

It will be appreciated that the above descriptions are intended only to serve as examples, and that many other embodiments are possible within the scope of the present invention as defined in the appended claims.

The invention claimed is:

1. An additive fabrication method for sequentially incrementing a workpiece to form a desired object, the method comprising the steps of:
   a. providing a quantity of source material including metallic or ceramic material, at least at a location where a structural element is to be added to the workpiece;
   b. processing the quantity of source material by application of localized microwave radiation that induces either a thermal-runaway instability and/or inner plasma breakdown in between the source material particles, which expedites the melting process, so as to transform, consequently, the source material into an integrated portion of the workpiece, thereby generating an incremented workpiece, and
   c. repeating steps (a) and (b) to sequentially increment the workpiece to form the desired object,
wherein said localized microwave radiation is applied through a near-field microwave applicator configured to apply the microwave radiation to transform the source material within an included volume receiving the localized microwave radiation, said included volume having at least one dimension smaller than a wavelength of the microwave radiation.

2. The additive fabrication method of claim 1, wherein further comprising adjusting a size of said included volume used to construct the object, employing a smaller included volume in regions where intricate detail or high precision is required, and a larger included volume to reduce fabrication time for larger contiguous regions, wherein said adjusting of size is performed by dynamically varying the volume of source material delivered.

3. The additive fabrication method of claim 1, further comprising adjusting the size of said included volume used to construct the object employing a smaller included volume in regions where intricate detail or high precision is required, and a larger included volume to reduce fabrication time for larger contiguous regions wherein said adjusting of size is performed by a change to the microwave pulse, power or duration or switching between two different wavelengths of microwave radiation.

4. The additive fabrication method of claim 1, wherein said source material is provided as a powder that is selectively integrated with the workpiece by application of the localized microwave radiation which creates a thermal-runaway instability and/or inner plasma breakdown.

5. The additive fabrication method of claim 4, wherein said powder is provided via a powder feeder selectively to the location where a structural element is to be added to the workpiece.

6. The additive fabrication method of claim 5, wherein said localized microwave radiation is applied through a near-field microwave applicator, and wherein at least part of said powder feeder passes through the near-field microwave applicator and is integrated with it.

7. The additive fabrication method of claim 6, wherein the localized microwave radiation is applied through a coaxial waveguide applicator, and wherein the powder feeder passes the powder along a channel formed within an inner conductor of the coaxial waveguide applicator.

8. The additive fabrication method of claim 1, wherein said source material is provided as a continuous solid material that is fed to the location where a structural element is to be added to the workpiece.

9. The additive fabrication method of claim 8, wherein said continuous solid material is formed as a wire.

10. The additive fabrication method of claim 9, wherein the localized microwave radiation is applied through a near-field microwave applicator, and wherein the wire is fed through the near-field microwave applicator.

11. The additive fabrication method of claim 9, wherein the localized microwave radiation is applied through an open-ended coaxial waveguide applicator, and wherein the wire is fed along a channel formed within an inner conductor of the coaxial waveguide applicator, or serving as the inner conductor of the coaxial waveguide applicator.

12. The additive fabrication method of claim 8, wherein said continuous solid material is formed as a sheet.

13. The additive fabrication method of claim 1, wherein said source material is selected among the elements of a group comprising a metallic material or a ceramic material, in a form of either powder, wire and/or sheet.

14. The additive fabrication method of claim 1, wherein an entirety of said workpiece is formed from said source material.

* * * * *